(12) United States Patent
Fang

(10) Patent No.: US 10,013,066 B2
(45) Date of Patent: Jul. 3, 2018

(54) GENERATING A SCREENSHOT

(71) Applicant: Alibaba Group Holding Limited, George Town (KY)

(72) Inventor: Jianjiang Fang, Hangzhou (CN)

(73) Assignee: Alibaba Group Holding Limited (KY)

( * ) Notice: Subject to any disclaimer, the term of this patent is extended or adjusted under 35 U.S.C. 154(b) by 588 days.

(21) Appl. No.: 14/673,002

(22) Filed: Mar. 30, 2015

(65) Prior Publication Data
US 2015/0286281 A1    Oct. 8, 2015

(30) Foreign Application Priority Data

Apr. 4, 2014  (CN) .......................... 2014 1 0136897

(51) Int. Cl.
*G06F 3/033*  (2013.01)
*G06F 3/01*  (2006.01)
*G06F 3/0481*  (2013.01)
*G06F 3/0488*  (2013.01)

(52) U.S. Cl.
CPC .......... *G06F 3/017* (2013.01); *G06F 3/04815* (2013.01); *G06F 3/04883* (2013.01); *G06F 2203/04101* (2013.01)

(58) Field of Classification Search
None
See application file for complete search history.

(56) References Cited

U.S. PATENT DOCUMENTS

| 9,058,100 B2 | 6/2015 | Li |
| 2010/0331041 A1 | 12/2010 | Liao et al. |
| 2013/0159927 A1* | 6/2013 | Chuang ................. G06F 3/0488 715/810 |
| 2013/0293454 A1* | 11/2013 | Jeon ........................ G06F 3/017 345/156 |
| 2014/0043265 A1 | 2/2014 | Chang et al. |
| 2014/0053116 A1 | 2/2014 | Smith et al. |
| 2014/0210729 A1 | 7/2014 | Chattopadhyay et al. |
| 2014/0267061 A1 | 9/2014 | Vandermeijden |

FOREIGN PATENT DOCUMENTS

EP    2634680    9/2013

OTHER PUBLICATIONS

Samsung, "GT-19300 user manual" May 1, 2012, Accessed at https://krogeriwireless.com/sites/default/files/Galaxy%20S3%20User%20Guid_0.pdf on Jun. 4, 2015.
Jrin.Net"How to take a screenshot on the Samsung Galaxy S3" Jun. 8, 2012 Accessed at https://www.youtube.com/watch?v=YhIGMHUoums on Jun. 4, 2015.

* cited by examiner

*Primary Examiner* — Jeffrey A Gaffin
*Assistant Examiner* — Ayesha Huertas Torres
(74) *Attorney, Agent, or Firm* — Van Pelt, Yi & James LLP

(57) ABSTRACT

Generating a screenshot is disclosed, including: obtaining, from a non-contact gesture identifying sensor associated with a device, a plurality of position points associated with an object's non-contact gesture movement corresponding to respective ones of a plurality of sampling times; determining that the object's non-contact gesture movement comprises a preset non-contact screenshot gesture based at least in part on the plurality of position points meeting a condition associated with the preset non-contact screenshot gesture; and generating a screenshot in response to the determination that the object's non-contact gesture movement comprises the preset non-contact screenshot gesture.

22 Claims, 9 Drawing Sheets

GENERATING A SCREENSHOT

CROSS REFERENCE TO OTHER APPLICATIONS

This application claims priority to People's Republic of China Patent Application No. 201410136897.0 entitled A METHOD AND A DEVICE FOR CAPTURING SCREENSHOTS FROM SMART TERMINALS, filed Apr. 4, 2014 which is incorporated herein by reference for all purposes.

FIELD OF THE INVENTION

The present application relates to a field of computer application technology. In particular, the present application relates to techniques for capturing screens from devices.

BACKGROUND OF THE INVENTION

When operating a device such as a mobile phone or a tablet computer, a user may need to save the information (e.g., text, images, web pages, etc.) that he or she is browsing. The select and copy approach may be used to duplicate the information presented on the screen, but the steps involved may be relatively cumbersome and will be subject to certain constraints. However, not all types of information can be duplicated using a select and copy technique. Therefore, screenshots can be used to capture information from the screens of devices.

Below are two types of conventional screenshot generation techniques:

In the first type of screenshot generation technique, the screen capture function is realized by setting up a specialized button or a specialized combination of buttons which, after they are simultaneously engaged, save a screenshot of whatever is presented at the screen of the device. For example, a screen capture may be initiated by pressing the power button plus a volume increase/decrease button or plus some virtual buttons, simultaneously. However, this traditional interactive approach may be inconvenient because it requires the users to simultaneous reach for and push various buttons. Therefore, such an approach may lead to erroneous operations.

In another type of screenshot generation technique, the screen capture function is realized through specific traces created by sliding a user's finger or palm across the screen of the device. For example, a screenshot could be triggered by an enclosed path of a certain size traced upon the screen by the user's finger. However, such an approach may cause a certain amount of damage to the screen and may also lead to erroneous operations.

BRIEF DESCRIPTION OF THE DRAWINGS

Various embodiments of the invention are disclosed in the following detailed description and the accompanying drawings.

DETAILED DESCRIPTION

Figure 1:
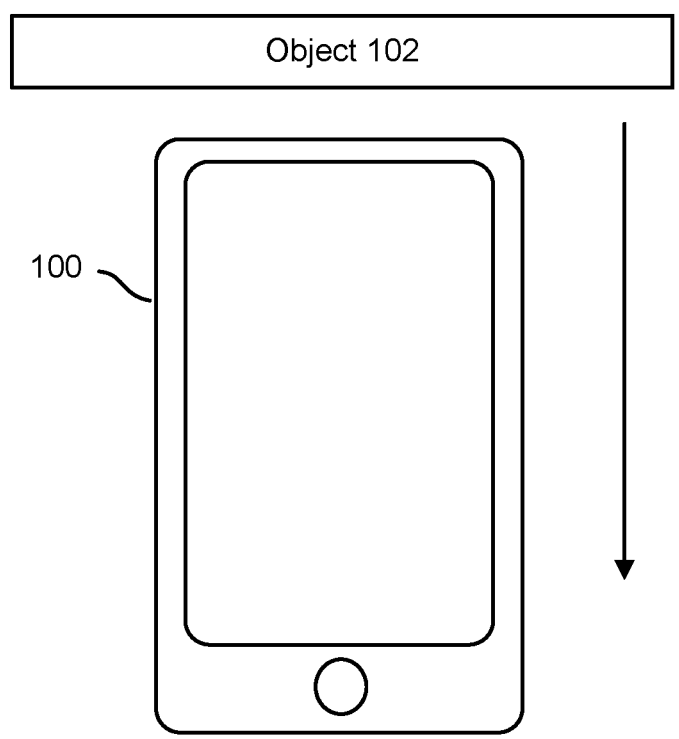
FIG. 1 is a diagram showing an embodiment of a system for generating a screenshot.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of generating a screenshot are described herein. A movement of an object near a device is captured by a non-contact gesture identifying sensor associated with the device. In various embodiments, the "non-contact gesture identifying sensor" comprises a sensor that can detect a movement or gesture that is performed with a given distance from the sensor at one or more sampling points. In various embodiments, the captured movement comprises a set of position points recorded at each of one or more sampling times. It is determined whether the object's movement is a preset non-contact screenshot gesture. In various embodiments, a "preset non-contact screenshot gesture" comprises a gesture that is configured to cause a screenshot to be generated at the device. In the event that the object's movement is a preset non-contact screenshot gesture, a screenshot is generated at the device. For example, the object performing the captured movement may comprise a user's hand moving near (but not contacting) the device and if such a movement is determined to be a preset non-contact screenshot gesture, then a screenshot is triggered to be generated at the device.

FIG. 1 is a diagram showing an embodiment of a system for generating a screenshot.

In various embodiments, movements or gestures that trigger a screenshot capture are "non-contact," or rather are movements or gestures that do not make physical contact with (e.g., the screen of) a device, such movements or gestures are captured by one or more non-contact gesture identifying sensors that are associated with the device on which the screenshot is to be generated. In some embodiments, the non-contact gesture identifying sensor(s) are included in the device. In some embodiments, the non-contact gesture identifying sensor(s) are not included in the device but attached to the exterior of the device. In various embodiments, a "non-contact gesture identifying sensor" comprises any sensor that can detect a movement or gesture that is performed with a given distance from the sensor at one or more sampling points. In various embodiments, a non-contact gesture identifying sensor detects a movement or gesture through capturing/measuring one or more position points of a moving object (e.g., the side of a user's palm) at each of one or more sampling times, as will be described in further detail below. Different non-contact gesture identifying sensors may detect movements or gestures within different distances. In various examples, the non-contact gesture identifying sensor includes an XYZ interactive sensor, an infrared sensor, a far-near sensor, a light sensor, or a combination thereof.

In the example shown in FIG. 1, device 100 comprises a device at which a screenshot is to be generated. In various embodiments, device 100 includes and/or is otherwise equipped with a non-contact gesture identifying sensor. Device 100 comprises any device with a screen. Examples of device 100 include a smart phone, a mobile phone, a mobile device, a tablet device, and/or any other computing device. As will be described in further detail below, the non-contact gesture identifying sensor of device 100 will capture a movement of an object, such as, for example, object 102 near (but not contacting) the screen of device 100 and determine whether the captured movement qualifies as a preset non-contact screenshot gesture. Examples of object 102 comprise a user's hand, the side of the user's palm, and one or more of the user's fingers. Object 102 can be moving over device 100 in various directions, such as, for example, from (near) the top of device 100 towards the bottom of device 100. As described above, a "preset non-contact screenshot gesture" comprises a gesture that is configured to cause a screenshot to be generated at device 100.

Figure 2:
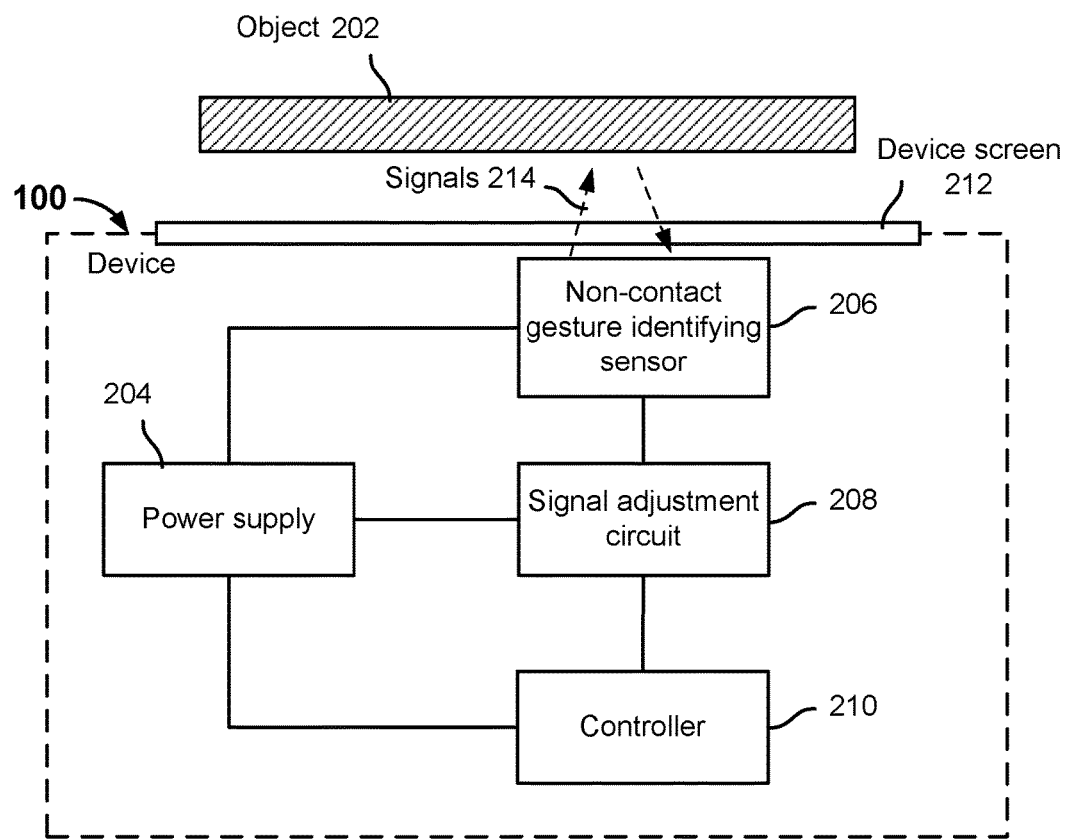
FIG. 2 is a diagram showing an example of a device including a non-contact gesture identifying sensor.

FIG. 2 is a circuit diagram showing an example of a device including a non-contact gesture identifying sensor. The diagram shows an example of a device that includes non-contact gesture identifying sensor 206. Non-contact gesture identifying sensor 206 may represent one or more non-contact gesture identifying sensors. The example shows a top or bottom view diagram of the device from one of the device's ends. In some embodiments, device 100 of FIG. 1 is implemented using the example of FIG. 2. As shown in the example, non-contact gesture identifying sensor 206 is positioned on the obverse of the device near the screen of the device (device screen 212). Because the object's movement, in various embodiments, is performed near the front side of the device that includes the screen, placing non-contact gesture identifying sensor 206 near the front side of the device facilitates more sensitive detection of object 202 that is moving near device screen 212. In some embodiments, object 202 comprises a user's hand. In particular, in some embodiments, object 202 is the side of a user's palm. As object 202 moves relative to the front side of device 100, in some embodiments, non-contact gesture identifying sensor 206 is configured to transmit signals 214 such as, for example, infrared signals at the detected object, object 202. The infrared or other signals are reflected by moving object 202 back to non-contact gesture identifying sensor 206 inside device 100. After signals 214 undergo processing such as, for example, wave filtering and amplification by signal adjustment circuit 208, the processed signals are sent to a processor (not shown) such as, for example, a central processing unit (CPU) or microcontroller unit (MCU) for conversion to movement data (e.g., one or more position points). It should be noted that the side of the palm (or any other object) can be detected by the non-contact gesture identifying sensor so long as the distance between it and the device is within the preset detection range of the non-contact gesture identifying sensor. Device 100 may also include power supply 204 to supply power to non-contact gesture identifying sensor 206, signal adjustment circuit 208, controller 210, and other units of device 100.

In various embodiments, a "position point" may comprise a coordinate in three dimensional (3D) space, e.g., a point with an x-value, a y-value, and a z-value. As object 202 moves, non-contact gesture identifying sensor 206 detects and records a set of position points associated with the current location of object 202 at various sampling times. For example, non-contact gesture identifying sensor 206 can detect and record a set of position points associated with the current location of object 202 every predetermined number of seconds. The position points across the various sampling times can be used to describe the movement of object 202. As will be described in further detail below, the detected and recorded movement of an object such as object 202 can be used to determine whether the movement of the object meets a condition associated with a preset non-contact screenshot gesture. If the movement of the object meets a condition associated with the preset non-contact screenshot gesture, then the movement of the object qualifies as a preset non-contact screenshot gesture and a screen capture of the information that is currently presented at device screen 212 is generated and stored.

By allowing a user's non-contact movement to trigger the generation of a screenshot, screenshots can be conveniently generated by the user without requiring the user to simultaneously engage multiple buttons at the device and/or even touch the screen of the device.

Figure 3:
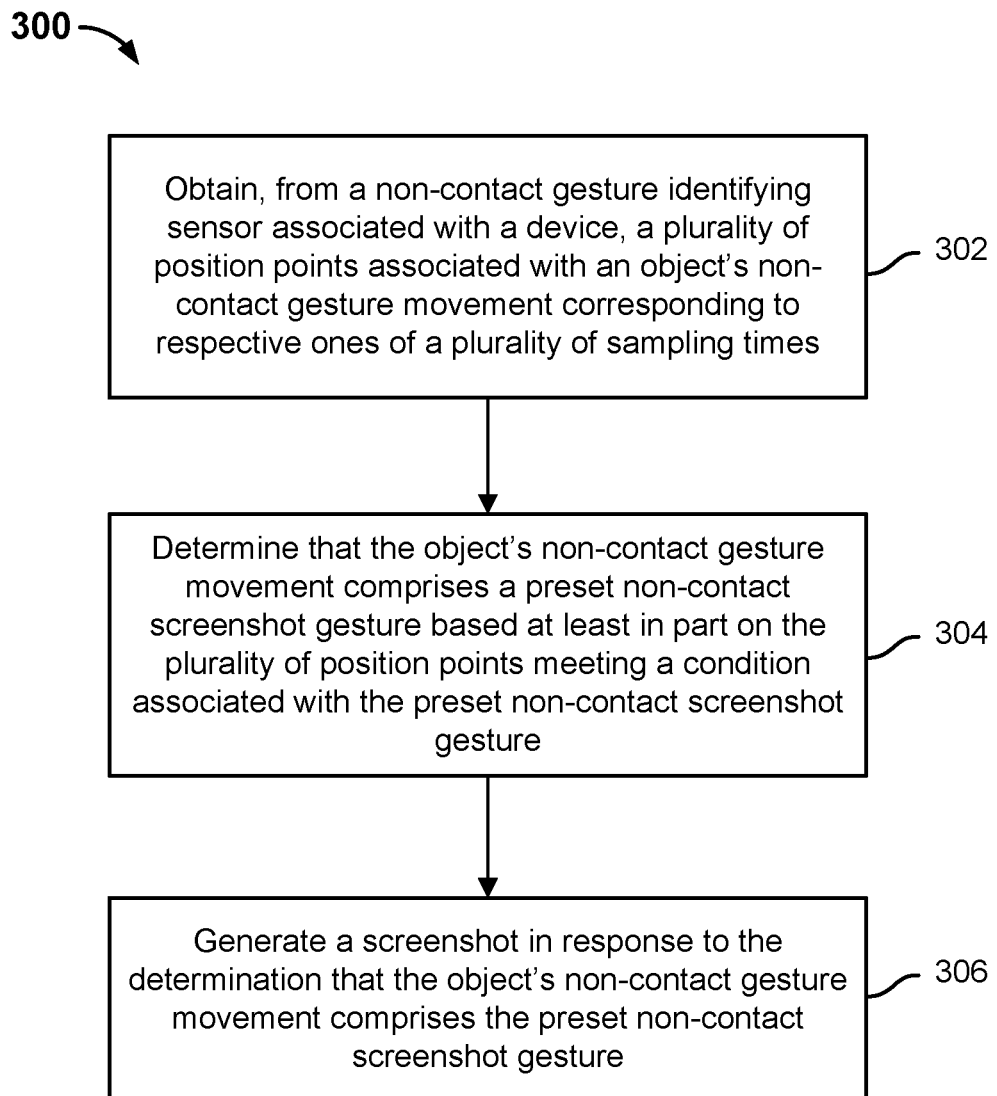
FIG. 3 is a flow diagram showing an embodiment of a process for generating a screenshot.

FIG. 3 is a flow diagram showing an embodiment of a process for generating a screenshot. In some embodiments, process 300 is implemented at device 100 of FIG. 1.

At 302, a plurality of position points associated with an object's non-contact gesture movement corresponding to respective ones of a plurality of sampling times is obtained from a non-contact gesture identifying sensor associated with a device.

In various embodiments, one or more non-contact screenshot gestures that can trigger a screen capture at the device are preset. In various embodiments, a preset non-contact screenshot gesture describes a type and/or orientation of movement by an object that when detected by the device, will cause a screenshot capture to be performed at the device. In some embodiments, a configuration interface may be presented to the user such that the user can configure his or her own preset non-contact screenshot gesture and/or select among certain preset non-contact screenshot gestures to use. Therefore, a screenshot can be generated based on a captured movement that is determined to qualify as any one of potentially multiple preset non-contact screenshot gestures that have been configured at the device.

Examples of a preset non-contact screenshot gesture may comprise: a movement above the screen of the device in a non-contact manner from (near) the upper end of the screen towards the lower end of the screen of the device, a movement from (near) the lower end towards the upper end of the screen of the device, a movement from (near) the left side towards the right side of the screen of the device, a movement from (near) the right side towards the left side of the screen of the device, or a movement (diagonally) from (near) the upper-left corner toward the lower-right corner of the screen of the device.

In various embodiments, an object moves near the screen of a device, which includes one or more non-contact gesture identifying sensors. An object's movement relative to a device is captured by the non-contact gesture identifying sensor(s) as a set of position points at each of one or more sampling times. Each position point describes a position of a portion of the object in 3D space relative to the position of the device. As such, each position point comprises a 3D point that includes a set of x, y, and z coordinates or values. Different position points can each track a different portion of the object and as such, multiple position points can be detected and recorded by the non-contact gesture identifying sensor(s) at each sampling time. In some embodiments, a sampling frequency can be preset such that position points associated with the moving object can be detected and recorded based on the preset sampling frequency.

Figure 4:
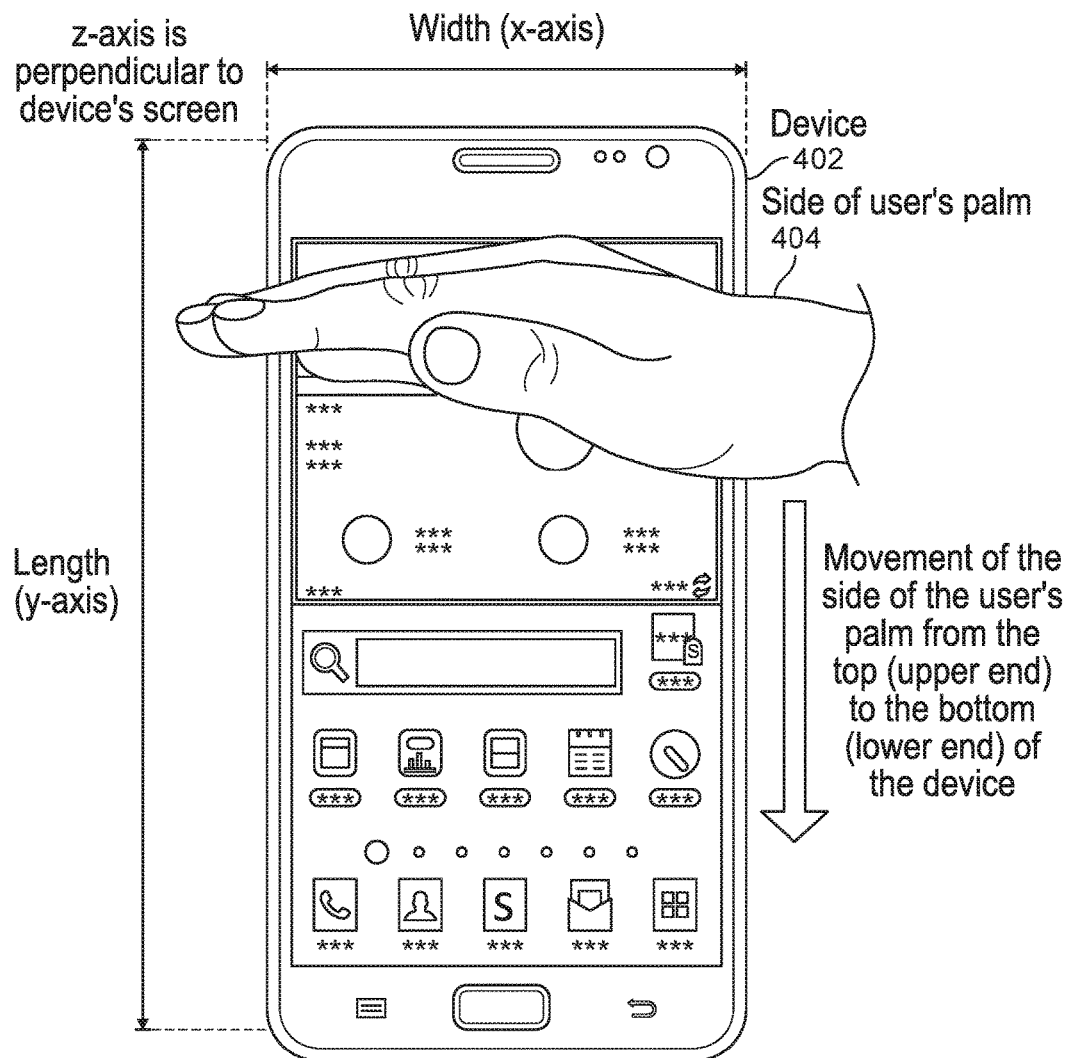
FIG. 4 is a diagram showing the side of a user's palm moving near the device.

In some embodiments, the moving object that is captured by the non-contact gesture identifying sensor(s) is the side of a user's palm moving near the device. FIG. 4 is a diagram showing the side of a user's palm moving near the device. In the example, side of user's palm 404 is moving from (near) the top of device 402 towards the bottom of device 402. As shown in the example, side of user's palm 404 is moving along the front side of device 402 that includes a screen. One or more non-contact gesture identifying sensor (s) within device 402 capture position points associated with side of user's palm 404 at various sampling times as side of user's palm 404 moves from the top to the bottom of device 402. Before a position point can be described in this example, the x, y, and z axes of the coordinate system used by the position points must first be defined. As shown in the example of FIG. 4, the x-axis extends along the width direction of device 402; the y-axis extends along the length direction of device 402; and the z-axis extends perpendicular to the screen of device 402.

In some embodiments, non-contact gesture identifying sensor(s) may detect position points associated with the object at fixed values along one particular axis/dimension. In some embodiments, the particular axis/dimension along which values are fixed for the position points is determined by the preset non-contact screenshot gesture that is looked for by the non-contact gesture identifying sensor(s). In the example of FIG. 4, the preset non-contact screenshot gesture that the non-contact gesture identifying sensor(s) are configured to detect is side of user's palm 404 moving from near the top of device 402 towards the bottom of device 402. As such, when the non-contact gesture identifying sensor(s) are looking for a top to bottom motion, the non-contact gesture identifying sensor(s) may detect a set of position points along side of user's palm 404 with respectively fixed x-values (where the x-axis is set along the width of the device) at each sampling time. As such, the non-contact gesture identifying sensor(s) will only measure y and z-values, which are variable, for each position point associated with side of user's palm 404 at each sampling time, because their respective x-values are fixed. For example, the non-contact gesture identifying sensor(s) measure the y and z-values for the four position points of side of user's palm 404 at respective fixed x-values of 200, 300, 400, and 500 at each sampling time, as will be described with the example of FIG. 5, below.

Figure 5:
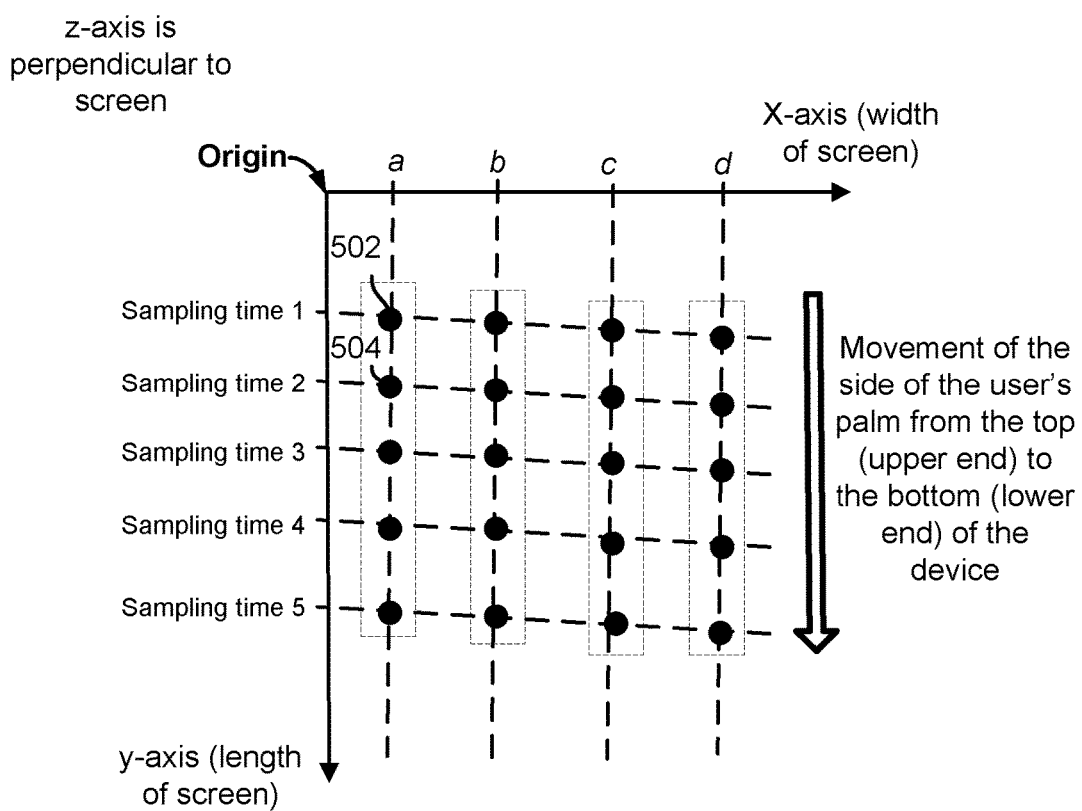
FIG. 5 is a diagram showing example position points of a side of a user's palm that are detected by a non-contact gesture identifying sensor for a device.

FIG. 5 is a diagram showing example position points of a side of a user's palm that are detected by a non-contact gesture identifying sensor for a device. The example of FIG. 5 uses the same x, y, and z axes of the device that was shown in the example of FIG. 4. As described above with FIG. 4, the x-axis extends along the width direction of the device; the y-axis extends along the length direction of the device; and the z-axis extends perpendicular to the screen of the device. In the example of FIG. 5, the origin is set at the top left hand corner of the device (although the origin can be set elsewhere relative to the device as well). In the example of FIG. 5, the moving object is the side of a user's palm moving from (near) the top of the device towards the bottom of the device. While various examples herein describe a non-contact gesture by a side of a user's palm, the non-contact gesture can be performed by other portions of a user's hand, for example, as well. In the example of FIG. 5, the x-values of the position points are fixed. Given that the x-values of the position points are fixed, the non-contact gesture identifying sensor measures the y and z coordinates/values of each position point tracking the side of a user's palm corresponding to each fixed x-value at each sampling time, of which there are five (e.g., Sampling Time 1, Sampling Time 2, Sampling Time 3, Sampling Time 4, and Sampling Time 5). In the example of FIG. 5, the fixed x-values for which corresponding y and z coordinates/values of the side of the user's palm are measured for each position point at each sampling point are a (x=200), b (x=300), c (x=400), and d (x=500). In the example of FIG. 5, a single non-contact gesture identifying sensor is used to make multiple position point measurements at each sampling time. (In some embodiments, multiple non-contact gesture identifying sensors (e.g., arranged in a grid) are used to make multiple position point measurements at each sampling time, where each sensor is configured to produce one position point measurement at each sampling time.) The fixed x-value of a position point represents a location along the width of the device that is fixed by the non-contact gesture identifying sensor, the measured y-value of a position point represents a location of the side of the user's palm along the length of the device at a certain sampling time, and the z-value of a position point measures a distance of the user's palm that is perpendicular to the device at the certain sampling time. These four fixed values along a particular axis/dimension (which is the x-axis in the example of FIG. 5) are, in some embodiments, referred to as "characteristic points" that are preset for the non-contact gesture identifying sensor. Thus, as the side of the user's palm moves from the top towards the bottom of the device, the y and z-values of a position point with the fixed x-value of a (x=200) can be captured at each of the five sampling times. Therefore, there will be five position points with the fixed x-value of a (x=200) corresponding to the five sampling times, in which each such position point has fixed x=200 and y and z-values that are measured at a respective sampling time. For example, position point 502 will have fixed x=200 and y and z-values of the side of the user's palm that were measured at sampling time 1. Also, for example, position point 504 will have fixed x=200 and y and z-values of the side of the user's palm that were measured at sampling time 2. Position points of the side of the user's palm are similarly captured with the fixed x-values of b (x=300), c (x=400), and d (x=500).

FIGS. 4 and 5 describe merely examples in which a detected object comprises the side of a user's palm moving from the top to the bottom of the device and other objects and/or other directions of motion can be set as the preset non-contact screenshot gesture and captured by the non-contact gesture identifying sensor. For example, other examples of directions of an object's movement can be an object (e.g., the side of a user's palm) moving from (near) the left side of a device towards the right side of the device. For example, if the non-contact preset screenshot gesture were an object moving from (near) the left side to right side of the device or from (near) the right side to the left side of the device without touching the screen of the device, then the y-values corresponding to the position points captured at each sampling time can be fixed.

Returning to FIG. 3, at 304, it is determined that the object's non-contact gesture movement comprises a preset non-contact screenshot gesture based at least in part on the plurality of position points meeting a condition associated with the preset non-contact screenshot gesture.

It is determined whether the captured movement qualifies as a preset non-contact screenshot gesture based at least in part on determining whether the captured position points across the various sampling times meet a condition associated with the preset non-contact screenshot gesture. By determining whether the movement meets a condition associated with the preset non-contact screenshot gesture, it can be determined whether the movement is intended to trigger a screenshot capture and/or if the movement had correctly triggered a screenshot capture. Put another way, comparing the movement to a condition associated with the preset non-contact screenshot gesture can filter out movements that are either not intended to trigger a screenshot capture and/or do not adequately trigger a screenshot capture (e.g., as a user may have accidentally performed the gesture that was captured by the non-contact gesture identifying sensor). In the event that the movement meets a condition associated with the preset non-contact screenshot gesture, then a screenshot is generated. Otherwise, in the event that the movement does not meet a condition associated with the preset non-contact screenshot gesture, then a screenshot is not generated.

Figure 6:
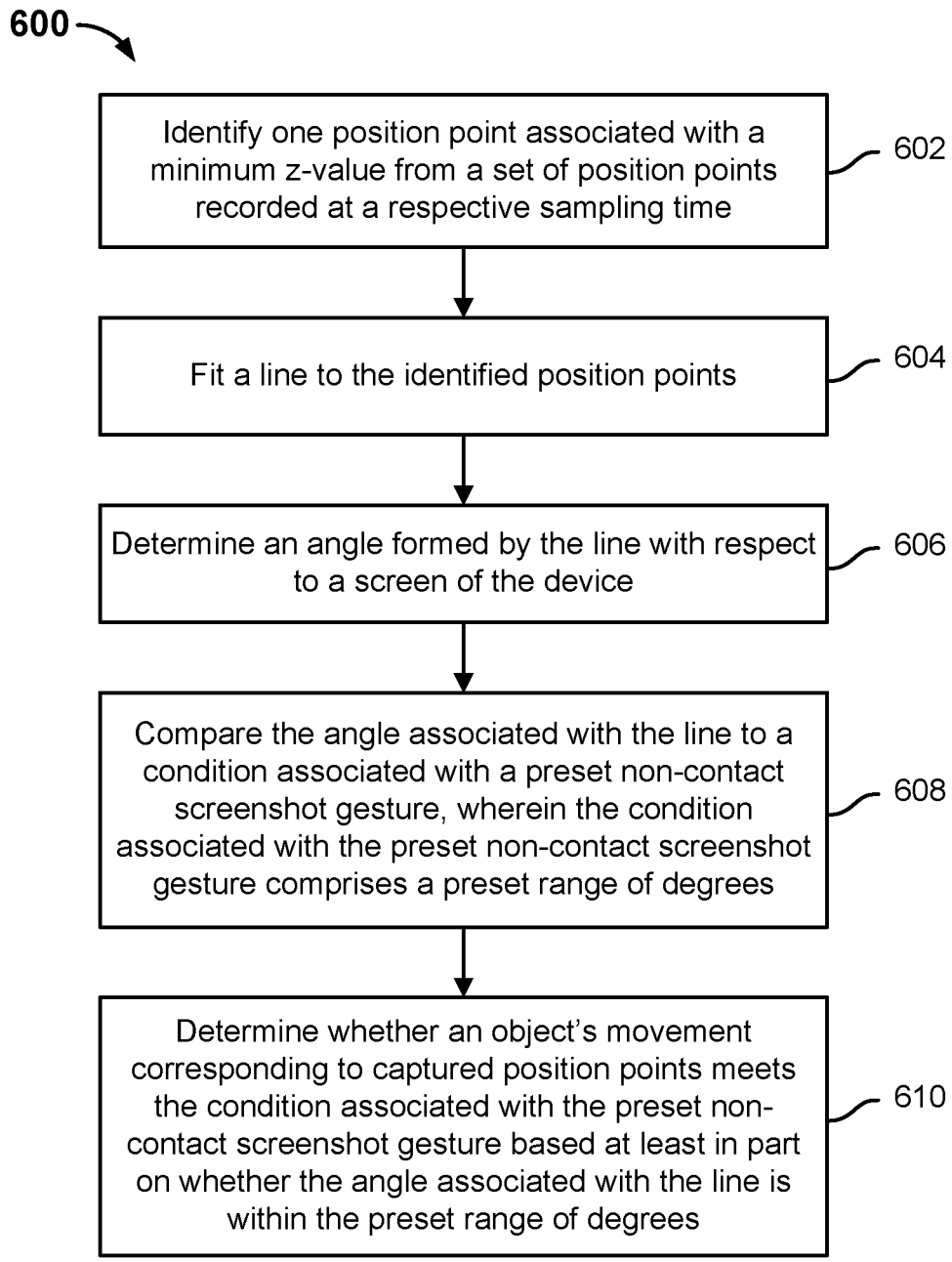
FIG. 6 is a flow diagram showing an example process of determining whether an object's movement meets a condition associated with a preset non-contact screenshot gesture.
Figure 7:
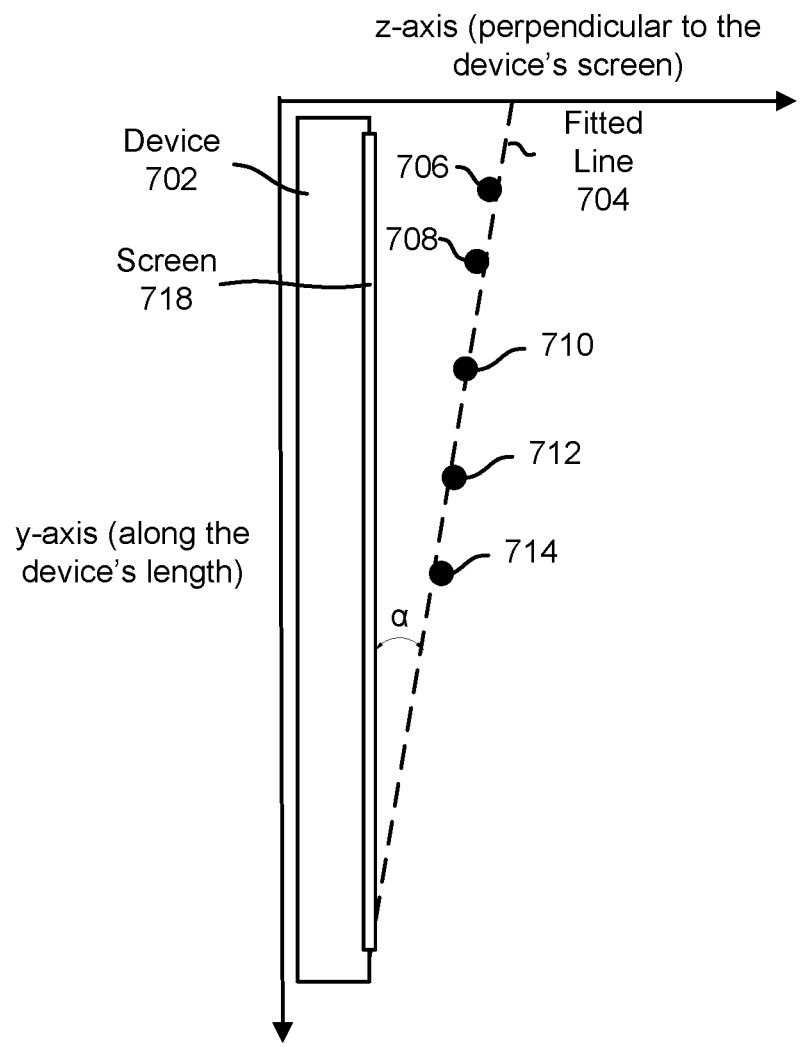
FIG. 7 is a diagram showing an example of determining whether an object's movement meets a condition associated with a preset non-contact screenshot gesture.

In various embodiments, the condition associated with the preset non-contact screenshot gesture is a test of whether the captured movement is "approximately parallel" to the screen of the device. A condition for being "approximately parallel" can be set as a preset range of degrees that a line or plane fitted to the captured position points across the different sampling times forms with the screen of the device. FIGS. 6 and 7 describe examples of determining whether an object's movement meets a condition associated with the preset non-contact screenshot gesture.

At 306, a screenshot is generated in response to the determination that the object's non-contact gesture movement comprises the preset non-contact screenshot gesture.

If the condition associated with the preset non-contact screenshot gesture is met by the captured movement, then a screen capture of at least a portion of the current content displayed at the device's screen is performed. Otherwise, if the condition associated with the preset non-contact screenshot gesture is not met by the captured movement, then a screen capture of the current content displayed at the device's screen is not performed.

In various embodiments, a screenshot can be generated by invoking a system screenshot technique that has been configured for the operating system used by the device. For example, if the operating system of the device were an Android, then a screenshot can be performed by invoking the "screenshot( )" method.

In some embodiments, a screenshot is generated from the entire content that is displayed at the device's screen (in other words, the screenshot is a full screen screenshot). In some embodiments, a screenshot is generated from only a portion of the content that is displayed at the device's screen. In some embodiments, the portion of the content that is displayed at the device's screen to be included in the screenshot can be determined by captured movement. The area of the content that is displayed at the device's screen and is to be included in the screenshot is sometimes referred to as the "screenshot area." For example, the position points captured at the first sampling time in the movement data capture process described above may be referred to as an "initial position" of the captured movement. Similarly, the position points captured at the last sampling time may be referred to as the "end position" of the captured movement.

The following are two example techniques for determining which portion or area of the content that is displayed at the device's screen is to be included in the screenshot:

In the first approach, the initial position and the ending position of the captured movement are regarded as, respectively, the upper and lower boundaries of the screenshot area, and the boundaries of the device's screen can serve as the remaining two boundaries of the screenshot area. For example, if the captured movement was the side of the user's palm moving from (near) the top towards the bottom of the screen of the device, the initial position of the side of the user's palm would serve as the upper boundary of the screenshot area, the end position of the side of the user's palm would serve as the lower boundary of the screenshot, the left screen boundary would serve as the left boundary of the screenshot area, and the right screen boundary of the screen would serve as the right boundary of the screenshot area. In this case, the user can customize the upper and lower boundaries of the screenshot area through the same continuous top-to-bottom movement that the user used to trigger the screenshot generation.

In the second approach, the initial position and ending position of the captured movement serve as two respective boundaries of the screenshot area. However, if another movement or gesture parallel to the screen and at a right angle to the movement direction of the movement or gesture that triggered the screenshot capture generation is detected within a preset time after the ending of the screenshot gesture, then the initial position and ending position of this subsequent operating gesture are used as the other two boundaries, respectively, of the screenshot area. For example, one second after the screenshot gesture (which, for example, is the side of the user's palm moving from (near) the top towards the bottom of the screen of the device) ends the user's palm then moves from (near) the left side towards the right side of the device. In this case, the initial position and end position of the screenshot gesture (the movement of the side of the user's palm moves from (near) the top towards the bottom of the device) would serve as the upper and lower boundaries, respectively, of the screenshot area and the initial values and end values of the subsequent movement (the movement of the user's palm moves from (near) the left side towards the right side of the device) would serve as the left and right boundaries, respectively, of the screenshot area.

In some embodiments, regardless of which approach is employed, a screenshot can be triggered if no further non-contact gesture has been detected within a preset interval after the captured movement is determined to qualify as a preset non-contact screenshot gesture. For example, the screenshot capture is performed if no subsequent non-contact gesture has been detected for three seconds after a captured movement is determined to qualify as a preset non-contact screenshot gesture. In some embodiments, such a preset interval is not used and a screenshot capture is performed immediately after a captured movement is determined to qualify as a preset non-contact screenshot gesture. For example, if a preset non-contact screenshot gesture is configured to trigger a screenshot capture of the entire content displayed on the screen of the device, then the screenshot can be triggered immediately after the captured movement is determined to qualify as a preset non-contact screenshot gesture.

In some embodiments, the generated screenshot can be stored as an image file in a predetermined storage location in the device. The user can access the screenshot from this storage location or the screenshot can be placed on a clipboard that the user can then paste to a designated location.

In some embodiments, the generated screenshot can be automatically opened in an editing application for the user to edit. For example, the user can use the editing application to clip the generated screenshot, rotate the generated screenshot, correct its colors, and carry out other editing treatment.

In some embodiments, the technique of generating a screenshot using a captured movement that is determined to qualify as a preset non-contact screenshot gesture can be used to generate a screenshot across any application that is displayed at the screen of the device. In some embodiments, the technique of generating a screenshot captured using a movement that is determined to qualify as a present non-contact screenshot gesture can be used to generate a screenshot for only specific applications that are displayed at the screen of the device.

In some embodiments, process 300 can be implemented by a standalone application executing at the device. In some embodiments, process 300 can be implemented by a built-in program executing at the device.

FIG. 6 is a flow diagram showing an example process of determining whether an object's movement meets a condition associated with a preset non-contact screenshot gesture. In some embodiments, process 600 is implemented at device 100 of FIG. 1. In some embodiments, 304 of process 300 of FIG. 3 can be implemented, at least in part, with process 600.

Process 600 describes an example process of determining whether a captured movement of the side of a user's palm from (near) the top of a device towards the bottom of the screen of the device meets a condition associated with a preset non-contact screenshot gesture. In the example, the captured position points associated with the movement of the side of the user's palm include fixed x-values.

At 602, one position point associated with a minimum z-value is identified from a set of position points recorded at a respective sampling time.

The position point with the minimum z-value among the set of position points captured at each respective sampling time is identified. Assume that in the example of process 600, the x, y, and z axes of the device are the same as those defined in the examples of FIGS. 4 and 5. Since the z-axis is perpendicular to the device's screen, the position point at each sampling time with the minimum z-value represents the position point of the side of the user's palm that is closest to the device's screen. As such, a position point with the minimum z-value is determined for each sampling time. For example, if there were four position points captured at the first sampling time, then the position point with the minimum z-value is selected from among those four position points captured at the first sampling time. Similarly, if there were four position points captured at the second sampling time, then the position point with the minimum z-value is selected from among those four points captured at the second sampling time. The process continues in this manner until the position point with the minimum z-value is selected from among the four position points captured at the last sampling time.

In various embodiments, each position point that was identified as having the minimum z-value at each sampling time can also be individually evaluated for whether its z-value is equal to 0 (e.g., or in some small preset range of values greater than 0). If any such identified position points has a z-value of zero (e.g., or in some small preset range of values greater than 0), then that indicates that the screen of the device was contacted/touched by the user's movement and that the movement can be immediately disqualified from being a non-contact screenshot gesture and therefore, process 600 ends.

At 604, a line is fitted to the identified position points.

In various embodiments, a straight line is fitted in 3D space to the identified position points with the minimum z-values across the different sampling points.

At 606, an angle formed by the line with respect to a screen of the device is determined.

Since it is impractical for the fitted line to be completely parallel to the device's screen, in various embodiments, it is assumed that the fitted line forms an angle when it intersects with the device's screen. In some embodiments, the fitted line is extended to the plane/surface of the device's screen and an angle, a, that is formed by the fitted line when it intersects with the plane/surface of the device's screen is determined.

At 608, the angle associated with the line is compared to a condition associated with a preset non-contact screenshot gesture, wherein the condition associated with the preset non-contact screenshot gesture comprises a preset range of degrees.

In various embodiments, the condition associated with a preset non-contact screenshot gesture is that the angle formed by the fitted line with respect to the device's screen falls within a preset range of degrees. The preset range of degrees represents a range of degrees in which the captured movement is considered to be "approximately parallel" to the screen of the device. The preset range of degrees may be set according to the size of the screen and/or sensitivity requirements. For example, if the device is associated with a large screen, the preset range of degrees can be set to be greater than 0 and less than 40 degrees. If the device is associated with a small screen, the preset range of degrees can be set to be greater than 0 and less than 30 degrees.

In some other embodiments, a plane is fitted to the identified position points across the sampling times and an angle formed by the fitted plane to the screen of the device is determined. Then, it is determined whether the movement qualifies as a preset non-contact screenshot gesture based on whether the angle formed by the fitted plane to the screen of the device is within the preset range of degrees associated with the non-contact screenshot gesture.

At 610, it is determined whether an object's movement corresponding to captured position points meets the condition associated with the preset non-contact screenshot gesture based at least in part on whether the angle associated with the line is within the preset range of degrees.

If the angle formed by the fitted line with respect to the device's screen falls within the preset range of degrees, then it is determined that the movement qualifies as a preset non-contact screenshot gesture. Otherwise, if the angle formed by the fitted line with respect to the device's screen does not fall within the preset range of degrees, then it is determined that the movement does not qualify as a preset non-contact screenshot gesture.

FIG. 7 is a diagram showing an example of determining whether an object's movement meets a condition associated with a preset non-contact screenshot gesture. The example process described by process 600 is applied to the example of FIG. 7. In FIG. 7, sets of position points associated with a movement of the side of a user's palm from (near) the top of device 702 towards the bottom of device 702 have been captured at five sampling times. Position point 706 is identified from the set of position points captured at the first sampling time as having the minimum z-value. Position point 708 is identified from the set of position points captured at the second sampling time as having the minimum z-value. Position point 710 is identified from the set of position points captured at the third sampling time as having the minimum z-value. Position point 712 is identified from the set of position points captured at the fourth sampling time as having the minimum z-value. Position point 714 is identified from the set of position points captured at the fifth sampling time as having the minimum z-value. Fitted line 704 is a straight line that has been fitted to position points 706, 708, 710, 712, and 714. Fitted line 704 forms angle α with respect to screen 718 of device 702. Whether the captured movement associated with the side of the user's palm qualifies as a preset non-contact screenshot gesture that triggers the generation of a screenshot depends on whether angle α falls within the preset range of degrees that forms the condition for qualifying as a preset non-contact screenshot.

FIGS. 6 and 7 describe merely examples in which a detected object comprises the side of a user's palm moving from the top to the bottom of the device and other objects and/or other directions of motion can be set as the preset non-contact screenshot gesture and captured by the non-contact gesture identifying sensor. For example, another example of a non-contact preset screenshot gesture can be an object (e.g., the side of a user's palm) moving from (near) the left side of a device towards the right side of the device. Where the detected movement is of the side of the user's palm from (near) the left side of a device towards the right side of the device, then the y-values of the captured position points associated with the movement would be fixed and the respective x-values and z-values of each position would be measured. However, process 600 of FIG. 6 can still be applied in determining whether an object's movement meets a condition associated with a preset non-contact screenshot gesture by identifying the position point with the minimum z-value at each sampling time, fitting a (e.g., straight) line/plane to the identified position points, determining an angle that the line/plane forms with respect to the device's screen, and determining whether this angle is within the preset range of degrees associated with qualifying as a preset non-contact screenshot gesture.

Figure 8:
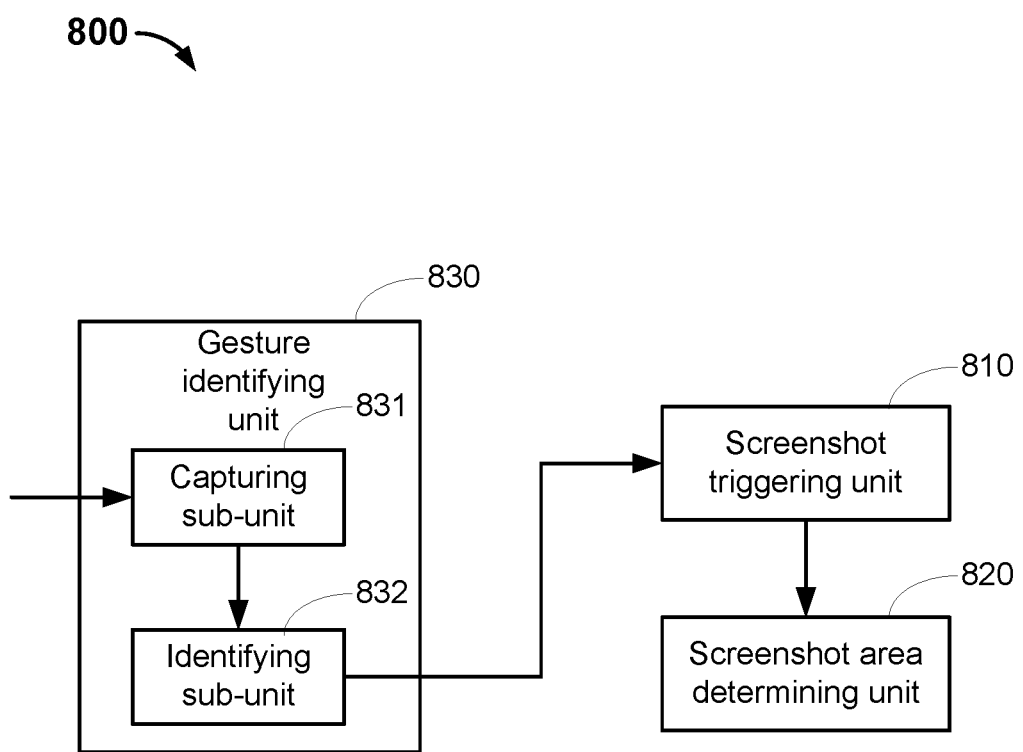
FIG. 8 is a diagram showing an embodiment of a system for generating a screenshot.

FIG. 8 is a diagram showing an embodiment of a system for generating a screenshot. In the example, system 800 includes gesture identifying unit 830, screenshot triggering unit 810, and screenshot area determining unit 820.

The units and sub-units can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units and sub-units may be implemented on a single device or distributed across multiple devices.

Gesture identifying unit 830 is configured to capture a movement performed by a user on a device and determine whether the captured movement qualifies as a preset non-contact screenshot gesture. In the event that a movement captured by gesture identifying unit 830 qualifies as a preset non-contact screenshot gesture, screenshot triggering unit 810 triggers the screenshot function of the device. In some embodiments, the preset non-contact screenshot gesture described above may comprise: a movement above the screen of the device in a non-contact manner from (near) the upper end of the screen towards the lower end of the screen of the device, a movement from (near) the lower end towards the upper end of the screen of the device, a movement from (near) the left side towards the right side of the screen of the device, a movement from (near) the right side towards the left side of the screen of the device, or a movement (diagonally) from (near) the upper-left corner toward the lower-right corner of the screen of the device.

Examples of a captured movement include the side of a user's palm moving over the screen of the device from (near) the upper end towards the lower end of the device without touching the screen; the side of a user's palm moving over the screen of the device from (near) the lower end towards the upper end of the device without touching the screen; the side of a user's palm moving over the screen of the device from (near) the left end towards the right end of the device without touching the screen; or the side of a user's palm moving over the screen of the device from (near) the right end towards the left end of the device without touching the screen. Other examples of a captured movement may comprise those above but performed with the side of a user's fingers instead of the side of the user's palm.

In some embodiments, gesture identifying unit 830 further comprises capturing sub-unit 831 and identifying sub-unit 832. Capturing sub-unit 831 uses a non-contact gesture identifying sensor to capture movement data from a detected movement. The non-contact gesture identifying sensor described above comprises, for example, but is not limited to: an XYZ interactive sensor, an infrared sensor, or a combination of a far-near sensor and a light sensor. The non-contact gesture identifying sensor has the ability to capture the 3D (x, y, and z) position coordinates of a number of points on a detected object (the side of a user's palm, for example) at different sampling times. In some embodiments, the captured position points have specified values along one particular dimension (e.g., the x-axis or the y-axis), depending on the type of preset non-contact screenshot gesture(s) that are to be detected. In some embodiments, position points may also be randomly captured from the detected object.

Identifying sub-unit 832 uses the movement data captured by capturing sub-unit 831 to determine whether the detected movement meets a condition associated with a preset non-contact screenshot gesture. For example, assume that the 3D coordinate system of the device is as follows: the origin is at the top left corner of the device screen, the x-axis extends along the width of the device, the y-axis extends along the length of the device, and the z-axis extends perpendicularly to the device screen:

Identifying sub-unit 832 is configured to determine the position point associated with the minimum z-value among the respective position points captured at the same sampling time, and determine whether the (e.g., straight) line (e.g., or plane) fitted to these points is "approximately parallel" to the device screen. If it is, identifying sub-unit 832 is configured to determine whether the movement qualifies as a preset non-contact screenshot gesture.

When a determination is made on whether the (e.g., straight) line (e.g., or plane) fitted to these points is approximately parallel to the device screen or not, identifying sub-unit 832 can determine whether the angle of the fitted (e.g., straight) line (e.g., or plane) to the device screen is within a preset range of degrees. If it is, then the fitted (e.g., straight) line (e.g., or plane) is considered as being "approximately parallel" to the device screen.

In some embodiments, each position point that was determined as having the minimum z-value for a respective sampling time can also be evaluated for whether its z-value is 0 (e.g., or in some small preset range of degrees greater than 0), which indicates that the screen of the device was contacted/touched by the user's movement and that the movement can be immediately disqualified from being a preset non-contact screenshot gesture.

After screenshot triggering unit 810 triggers the screenshot function, screenshot area determining unit 820 is configured to determine at least a portion of the content displayed at the device screen to include in the screenshot. In some embodiments, the full screen of the device is included the screenshot area. In some embodiments, only a portion of the content displayed at the screen of the device is included the screenshot area. Examples of determining a portion of the content displayed at the screen of the device to include in a screenshot area are described above.

Screenshot triggering unit 810 is configured to generate a screenshot capture by invoking a system screenshot technique corresponding to the operating system used by the device. Screenshot triggering unit 810 is configured to store the generated screenshot as an image file in a predetermined storage location in the device. The user can obtain the screenshot picture from this storage location. In some embodiments, screenshot triggering unit 810 is configured to place the generated screenshot on a clipboard and/or display the generated screenshot in an editing application to the user so that the user can clip it, rotate it, correct its colors, and carry out other editing treatment.

Figure 9:
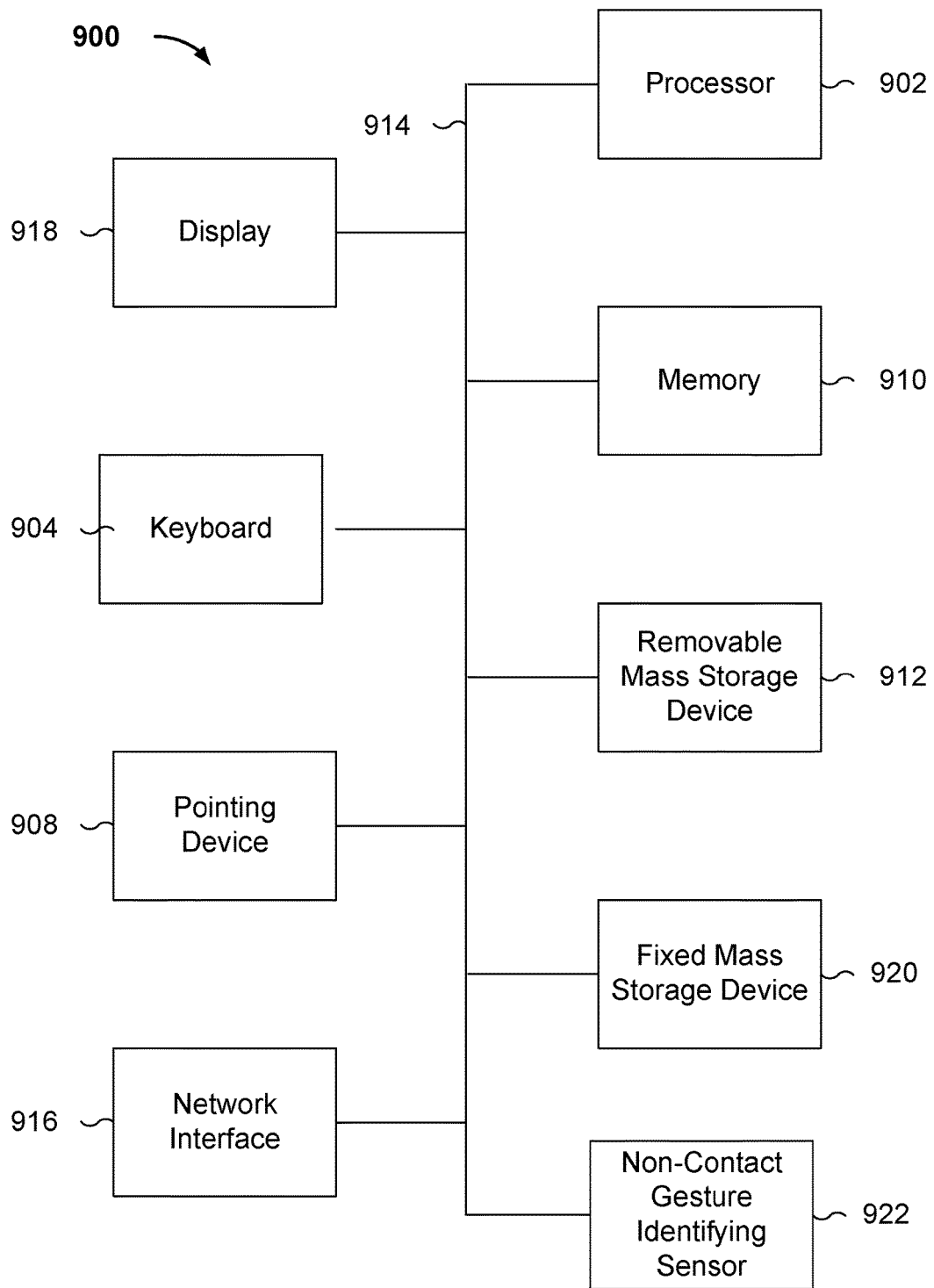
FIG. 9 is a functional diagram illustrating an embodiment of a programmed computer system for implementing generating a screenshot.

FIG. 9 is a functional diagram illustrating an embodiment of a programmed computer system for implementing generating a screenshot. As will be apparent, other computer system architectures and configurations can be used to generate a screenshot. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In some embodiments, process 902 is configured to receive position point data measured at one or more sampling times from non-contact gesture identifying sensor 922. In some embodiments, processor 902 includes and/or is used to generate a screenshot based at least in part on the position point data received from non-contact gesture identifying sensor 922.

Processor 902 is coupled bi-directionally with memory 910, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data, and objects used by the processor 902 to perform its functions (e.g., programmed instructions). For example, memory 910 can include any suitable computer readable storage media, described below, depending on whether, for example, data access needs to be bi-directional or uni-directional. For example, processor 902 can also directly and very rapidly retrieve and store frequently needed data in a cache memory (not shown).

A removable mass storage device 912 provides additional data storage capacity for the computer system 900 and is coupled either bi-directionally (read/write) or uni-directionally (read only) to processor 902. For example, storage 912 can also include computer readable media such as magnetic tape, flash memory, PC-CARDS, portable mass storage devices, holographic storage devices, and other storage devices. A fixed mass storage 920 can also, for example, provide additional data storage capacity. The most common example of fixed mass storage 920 is a hard disk drive. Mass storage 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display 918, a network interface 916, a keyboard 904, and a pointing device 908, as well as an auxiliary input/output device interface, a sound card, speakers, and other subsystems as needed. For example, the pointing device 908 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

The units described above in which the software function units are integrated may be stored in a computer-readable storage medium. The software function units described above are stored in a storage medium and include a number of commands whose purpose is to cause a piece of computer equipment (which may be a personal computer, a server, or network computer) or a processor to execute some of the steps in the method described in the various embodiments of the present invention. The storage medium described above encompasses: USB flash drive, mobile hard drive, read-only memory (ROM), random access memory (RAM), magnetic disk, optical disk, or various other media that can store program code.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    one or more processors configured to:
        provide an interface to configure one or more preset non-contact screenshot gestures;
        obtain, from a non-contact gesture identifying sensor associated with a device, a plurality of position points associated with an object's non-contact gesture movement corresponding to respective ones of a plurality of sampling times; and
        determine that the object's non-contact movement comprises one of the one or more preset non-contact screenshot gestures based at least in part on the plurality of position points meeting a condition associated with the one of the one or more preset non-contact screenshot gestures; and
generate a screenshot in response to the determination that the object's non-contact gesture movement comprises the one of the one or more preset non-contact screenshot gestures; and
    one or more memories coupled to the one or more processors, the one or ore memories configured to provide the one or more processors with instructions.

2. The system of claim 1, wherein a position point comprises a point in three-dimensional (3D) space.

3. The system of claim 2, wherein a set of position points recorded at a sampling time comprises respective fixed coordinates along a first dimension, measured coordinates along a second dimension, and measured coordinates along a third dimension.

4. The system of claim 1, wherein to determine that the object's non-contact gesture movement comprises the preset non-contact screenshot gesture includes to determine that the object's non-contact gesture movement is approximately parallel to the device.

5. The system of claim 1, wherein to determine that the object's non-contact gesture movement comprises the preset non-contact screenshot gesture comprises to:
    identify a position point associated with a minimum value in a dimension that is perpendicular from a screen associated with the device from a set of position points recorded at a respective sampling time;
    determine a fitted line based at least in part on identified position points;
    determine an angle formed by the fitted line with respect to the screen associated with the device;
    compare the angle associated with the fitted line to the condition associated with the preset non-contact screenshot gesture, wherein the condition associated with the preset non-contact screenshot gesture comprises a preset range of degrees; and
    determine that the object's non-contact gesture movement meets the condition associated with the preset non-contact screenshot gesture based at least in part on the angle associated with the fitted line being within the preset range of degrees.

6. The system of claim 1, wherein to determine that the object's non-contact gesture movement comprises the preset non-contact screenshot gesture comprises to:
    identify a position point associated with a minimum value in a dimension that is perpendicular from a screen associated with the device from a set of position points recorded at a respective sampling time;
    determine a fitted plane based at least in part on identified position points;
    determine an angle formed by the fitted plane with respect to the screen associated with the device;
    compare the angle associated with the fitted plane to the condition associated with the preset non-contact screenshot gesture, wherein the condition associated with the preset non-contact screenshot gesture comprises a preset range of degrees; and
    determine that the object's non-contact gesture movement meets the condition associated with the preset non-contact screenshot gesture based at least in part on the angle associated with the fitted plane being within the preset range of degrees.

7. The system of claim 1, wherein to determine that the object's non-contact gesture movement comprises the preset non-contact screenshot gesture comprises to:
    identify a position point associated with a minimum value in a dimension that is perpendicular from a screen associated with the device from a set of position points recorded at a respective sampling time;
    determine that the minimum value associated with the identified position point is within a predetermined preset range of values greater than zero; and
    determine that the object's non-contact gesture movement does not meet the condition associated with the preset non-contact screenshot gesture based at least in part on the determination that the minimum value associated with the identified position point is within the predetermined preset range of values greater than zero.

8. The system of claim 1, wherein the system further includes a screenshot area determining unit to determine a snapshot area,
    wherein a top boundary of the snapshot area is determined based at least in part on a first sampling time,
    wherein a bottom boundary of the snapshot area is determined based at least in part on a last sampling time,
    wherein a left boundary of the snapshot area is determined based at least in part on a left boundary of the device, wherein a right boundary of the snapshot area is determined based at least in part on a right boundary of the device, and wherein the screenshot is generated based at least in part on the snapshot area.

9. The system of claim 1, wherein the system further includes a screenshot area determining unit to determine a snapshot area, wherein a top boundary of the snapshot area is determined based at least in part on a first sampling time, wherein a bottom boundary of the snapshot area is determined based at least in part on a last sampling time, wherein a left boundary of the snapshot area is determined based at least in part on an initial value associated with an object's subsequent non-contact gesture movement, wherein a right boundary of the snapshot area is determined based at least in part on an end value associated with the object's subsequent non-contact gesture movement, and wherein the screenshot is generated based at least in part on the snapshot area.

10. The system of claim 1, wherein the screenshot is generated based at least in part on invoking a system screenshot generation technique corresponding to an operating system executing at the device.

11. The system of claim 1, wherein at least one of the one or preset more non-contact screenshot gestures is defined by a user.

12. The system of claim 1, wherein at least one of the one or more preset non-contact screenshot gestures is selected from a set of preset non-contact screenshot gestures.

13. A method, comprising:
providing an interface to configure one or more preset non-contact screenshot gestures;
obtaining, from a non-contact gesture identifying sensor associated with a device, a plurality of position points associated with an object's non-contact gesture movement corresponding to respective ones of a plurality of sampling times;
determining that the object's non-contact gesture movement comprises one of the one or more preset non-contact screenshot gestures based at least in part on the plurality of position points meeting a condition associated with the one of the one or more preset non-contact screenshot gestures; and
generating a screenshot in response to the determination that the object's non-contact gesture movement comprises the one of the one or more preset non-contact screenshot gestures.

14. The method of claim 13, wherein a position point comprises a point in three-dimensional (3D) space.

15. The method of claim 14, wherein a set of position points recorded at a sampling time comprises respective fixed coordinates along a first dimension, measured coordinates along a second dimension, and measured coordinates along a third dimension.

16. The method of claim 13, wherein determining that the object's non-contact gesture movement comprises the preset non-contact screenshot gesture includes determining that the object's non-contact gesture movement is approximately parallel to the device.

17. The method of claim 13, wherein determining that the object's non-contact gesture movement comprises the preset non-contact screenshot gesture comprises:
identifying a position point associated with a minimum value in a dimension that is perpendicular from a screen associated with the device from a set of position points recorded at a respective sampling time;
determining a fitted line based at least in part on identified position points;
determining an angle formed by the fitted line with respect to the screen associated with the device;
comparing the angle associated with the fitted line to the condition associated with the preset non-contact screenshot gesture, wherein the condition associated with the preset non-contact screenshot gesture comprises a preset range of degrees; and
determining that the object's non-contact gesture movement meets the condition associated with the preset non-contact screenshot gesture based at least in part on the angle associated with the fitted line being within the preset range of degrees.

18. The method of claim 13, wherein determining that the object's non-contact gesture movement comprises the preset non-contact screenshot gesture comprises:
identifying a position point associated with a minimum value in a dimension that is perpendicular from a screen associated with the device from a set of position points recorded at a respective sampling time;
determining a fitted plane based at least in part on identified position points;
determining an angle formed by the fitted plane with respect to the screen associated with the device;
comparing the angle associated with the fitted plane to the condition associated with the preset non-contact screenshot gesture, wherein the condition associated with the preset non-contact screenshot gesture comprises a preset range of degrees; and
determining that the object's non-contact gesture movement meets the condition associated with the preset non-contact screenshot gesture based at least in part on the angle associated with the fitted plane being within the preset range of degrees.

19. The method of claim 13, wherein determining that the object's non-contact gesture movement comprises the preset non-contact screenshot gesture comprises:
identifying a position point associated with a minimum value in a dimension that is perpendicular from a screen associated with the device from a set of position points recorded at a respective sampling time;
determining that the minimum value associated with the identified position point is within a predetermined preset range of values greater than zero; and
determining that the object's non-contact gesture movement does not meet the condition associated with the preset non-contact screenshot gesture based at least in part on the determination that the minimum value associated with the identified position point is within the predetermined preset range of values greater than zero.

20. The method of claim 13, further comprising determining a snapshot area,
wherein a top boundary of the snapshot area is determined based at least in part on a first sampling time,
wherein a bottom boundary of the snapshot area is determined based at least in part on a last sampling time,
wherein a left boundary of the snapshot area is determined based at least in part on a left boundary of the device,
wherein a right boundary of the snapshot area is determined based at least in part on a right boundary of the device, and
wherein the screenshot is generated based at least in part on the snapshot area.

21. The method of claim 13, further comprising determining a snapshot area,
- wherein a top boundary of the snapshot area is determined based at least in part on a first sampling time,
- wherein a bottom boundary of the snapshot area is determined based at least in part on a last sampling time,
- wherein a left boundary of the snapshot area is determined based at least in part on an initial value associated with an object's subsequent non-contact gesture movement,
- wherein a right boundary of the snapshot area is determined based at least in part on an end value associated with the object's subsequent non-contact gesture movement, and
- wherein the screenshot is generated based at least in part on the snapshot area.

22. A computer program product, the computer program product being embodied in a non-transitory computer readable storage medium and comprising computer instructions for:

- providing an interface to configure one or more preset non-contact screenshot gestures;
- obtaining, from a non-contact gesture identifying sensor associated with a device, a plurality of position points associated with an object's non-contact gesture movement corresponding to respective ones of a plurality of sampling times;
- determining that the object's non-contact gesture movement comprises one of the one or more preset non-contact screenshot gestures based at least in part on the plurality of position points meeting a condition associated with the one of the one or more preset non-contact screenshot gestures; and
- generating a screenshot in response to the determination that the object's non-contact gesture movement comprises the one of the one or more preset non-contact screenshot gestures.

\* \* \* \* \*